United States Patent
Luukkala et al.

[11] Patent Number: 5,918,287
[45] Date of Patent: Jun. 29, 1999

[54] MEASUREMENT DEVICE FOR MEASUREMENT OF THE TENSILE STRESS IN AN OPTICAL FIBER

[75] Inventors: Mauri Luukkala, Espoo; Heikki Räjkkönen, Helsinki, both of Finland

[73] Assignee: Soundek Oy, Espoo, Finland

[21] Appl. No.: 08/973,057

[22] PCT Filed: Mar. 19, 1997

[86] PCT No.: PCT/FI97/00178

§ 371 Date: Nov. 26, 1997

§ 102(e) Date: Nov. 26, 1997

[87] PCT Pub. No.: WO97/37203

PCT Pub. Date: Oct. 9, 1997

[30] Foreign Application Priority Data

Mar. 29, 1996 [FI] Finland ................................. 961421

[51] Int. Cl.[6] .................................................. G01L 5/10
[52] U.S. Cl. ........................................ 73/862.391; 73/800
[58] Field of Search ................. 73/862.391, 862.41, 73/862.451, 800; 356/73.1

[56] References Cited

U.S. PATENT DOCUMENTS

| | | | |
|---|---|---|---|
| 4,628,747 | 12/1986 | Weitz et al. | 73/862.44 |
| 4,833,928 | 5/1989 | Luukkala et al. | 73/862.39 |
| 4,914,960 | 4/1990 | Kordahi | 73/862.474 |
| 5,228,893 | 7/1993 | Smithgall | 73/862.41 |
| 5,359,904 | 11/1994 | Luukkala et al. | 73/862.391 |

FOREIGN PATENT DOCUMENTS

| | | | |
|---|---|---|---|
| 0549131 | 6/1993 | European Pat. Off. | G01L 5/10 |
| 0551115 | 7/1993 | European Pat. Off. | G01L 5/04 |
| 79410 | 12/1987 | Finland | G01L 5/10 |
| 89537 | 6/1993 | Finland | G01L 5/10 |

*Primary Examiner*—Max H. Noori
*Attorney, Agent, or Firm*—Steinberg & Raskin, P.C.

[57] ABSTRACT

A measurement device and method for measuring tension in an optical fiber or wire. The measurement device includes a device for producing a vibration surge in the optical fiber or wire which vibrates at a certain, pre-selected frequency and advances as a linearly polarized wave. An optical location-sensitive detector measures the advancing speed (v) of the wave. An illuminator device illuminates the optical fiber or wire so that a shadow or an image of the vibrating fiber or wire is cast onto the indictor whereby the tension (T) of the optical fiber or wire is calculated from the equation $T=v^2 \cdot M$, when M is the fiber mass per unit of length of the optical fiber or wire. The indicator device measures the time at which a departing wave surge passes by the indicator and the time at which an arriving wave surge reflected from a subsequent coating vat, or other wave reflector, passes by the indicator. The velocity of the wave is obtained from a difference in time between the departing wave surge and the arriving wave surge when the distance (X) between the indicator and the coating vat is known.

21 Claims, 1 Drawing Sheet

MEASUREMENT DEVICE FOR MEASUREMENT OF THE TENSILE STRESS IN AN OPTICAL FIBER

FIELD OF THE INVENTION

The invention concerns a measurement device for measurement of the tensile stress in an optical fiber or an equivalent wire, which measurement device is provided with a device for producing a vibration surge in the optical fiber, which vibration surge vibrates at a certain, pre-selected frequency and which advances as a linearly polarized wire wave, and with an optical location-sensitive indicator for measuring the advancing speed of the wire wave, and which measurement device is provided with an illuminator device for illuminating the optical fiber so that a shadow or an image of the vibrating fiber is cast onto the indicator, whereby the tensile stress of the optical fiber can be calculated from the equation $T=v^2 \cdot M$ when the fiber mass per unit of length is known.

BACKGROUND OF THE INVENTION

An optical fiber is a thin glass fiber, whose diameter is about 150 micrometres. An optical fiber is used for replacing a copper conductor in telecommunications, because the data communication capacity of an optical fiber is much higher than that of a copper conductor. Furthermore, there is no shortage of the raw-material of the optical fiber, which is the case with copper.

Optical fiber is prepared in a so-called draw tower, which is a large tower with a height of about 8 to 9 metres, at whose top end molten glass is drawn downwards into a thin fiber. When the hot fiber travels downwards, it cools, whereafter, at the lower end of the tower, the fiber can be coated with a certain polymer in a particular coating vat. After coating, the fiber is transferred after a tension meter onto a particular roller, on which it is wound into a roll. It is known that bare fiber cannot be bent, because it breaks apart. After the polymer coating, the fiber endures bending very well. The draw rate of the fiber is at present about 4 to 10 metres per second and, among other things, the draw rate of the fiber and partly the thickness of the fiber are regulated by means of a tension meter. Currently, measurement of tension does, however, not take place until after the coating, because a bare fiber cannot be contacted. A tension measurement that takes place after the coating is, however, too late and provides an incorrect result concerning the tensile stress in a bare fiber. However, it would be desirable to increase the fiber draw rate, but in view of the process control, the tension of the bare fiber should be measured without contacting the fiber. The fiber tension meter that is used currently is a spring-loaded roller, over which a coated fiber advances. The magnitude of the loading indicates the fiber tension. There are some meters by whose means the tensile stress in a bare fiber can be measured by measuring the double refraction of light by directing light at the fiber and by measuring the magnitude of the double refraction. Such a meter is, however, highly complicated and expensive, and the phenomenon itself is weak. Therefore it has not gained popularity.

The object of the present invention is a novel acousto-optical meter, which measures the tension of a fiber by means of wire waves if the mass of the fiber per unit of length is known. By means of the meter it is possible to measure the tensile stress in the fiber without contacting the fiber and so that the advancing speed of the fiber is also compensated for. The principle is such that an advancing vibration is produced in the fiber, and the advancing speed v of said vibration is measured. If the mass of the fiber per unit of length is known (which is, as a rule, always the case), the tensile stress T in the fiber can be calculated from the simple formula:

$$T = v^2 \cdot M,$$

wherein M is the mass of the fiber per unit of length.

Thus, in the meter, first a suitable advancing wire-wave surge must be produced in the bare fiber, and the advancing speed of said surge is measured in a certain way without contacting the fiber. In such a case, the tensile stress can be calculated from the formula mentioned above.

As regards the prior art, the above electro-optical meter may be mentioned, which measures the tensile stress in the fiber on the basis of double refraction of light. The glass fiber material is often quartz, in which a double refraction of light proportional to the tension occurs. It is a problem in such a meter that the light has to be focused accurately on the moving glass fiber of a thickness of 150 micrometres, whereafter the double refraction has to be measured.

In the publications FI Patent 79,410 and U.S. Pat. No. 4,833,928, a solution has been described in which the tension in a moving thin film or membrane is measured in a way slightly similar to the present invention. A loudspeaker is brought near the membrane, by means of which loudspeaker a mechanical surge is brought about onto the membrane, which surge advances in the direction of the tension in the membrane. The advancing speed of the surge is measured by optically measuring the vibration of the membrane at two different points on the membrane. When the wave speed and the basis weight of the membrane are known, the tension can be calculated. However, such a meter cannot be used for measuring the tensile stress in a thin transparent glass fiber.

The publications U.S. Pat. No. 5,359,904 and FI 89,537 expressly describe a device for measurement of the tensile stress in an optical fiber by making use of a so-called wire wave advancing in the fiber and the measurement of the speed of said wave. However, in said publications, two separate optical measurement stations are employed, by whose means the speed of the wire wave is measured. Also, in said patent, reflections of the wire wave from the coating vat are not utilized either. The present invention, however, differs from this patent mentioned above in a number of essential different ways, as we shall see later. In the present invention, just one optical measurement station is employed for measurement of the tensile stress, and expressly the reflecting coming from the end of the fiber is utilized. Further, the compensation for speed is achieved automatically by means of this novel arrangement. The compensation for speed is becoming ever more important as the fiber draw speed becomes higher and during the "ramp-up" of the draw. Thus, the measurement device would be simplified to a considerable extent.

OBJECTS AND SUMMARY OF THE INVENTION

The present invention is characterized in that the indicator device in the measurement device is fitted to measure the by-pass time of the departing wire wave surge and the by-pass time of the wire wave surge reflected from the coating vat, in which connection the speed of the wire wave is obtained by measuring the difference in time between the departing vibration and the arriving vibration when the distance between the indicator device and the coating vat is known.

When a fiber is drawn down in a draw tower, the fiber is bare within a distance of several metres until the fiber advances into the coating vat. In this area, first, it is possible to install an enclosed loudspeaker so that there is a narrow gap in the front wall of the enclosure, through which gap the sound wave surge can be discharged. The gap is parallel to the fiber, so that owing to the compressed air that is discharged, the fiber enters into a vibration movement in a way similar to a guitar string when it is plucked. In practice it has been noticed that a surge vibration frequency of about 300 Hz is suitable for purposes of measurement of the tensile stress. After this, the advancing speed of the fiber vibration is measured optically by means of one optical detector only, and not by means of two detectors, which was the case in the prior art.

BRIEF DESCRIPTION OF THE PREFERRED EMBODIMENTS

The invention will be described in detail with reference to a preferred embodiment of the invention illustrated in the figures in the drawing, the invention being, however, not supposed to be confined to said embodiment alone.

Figures 1, 2:
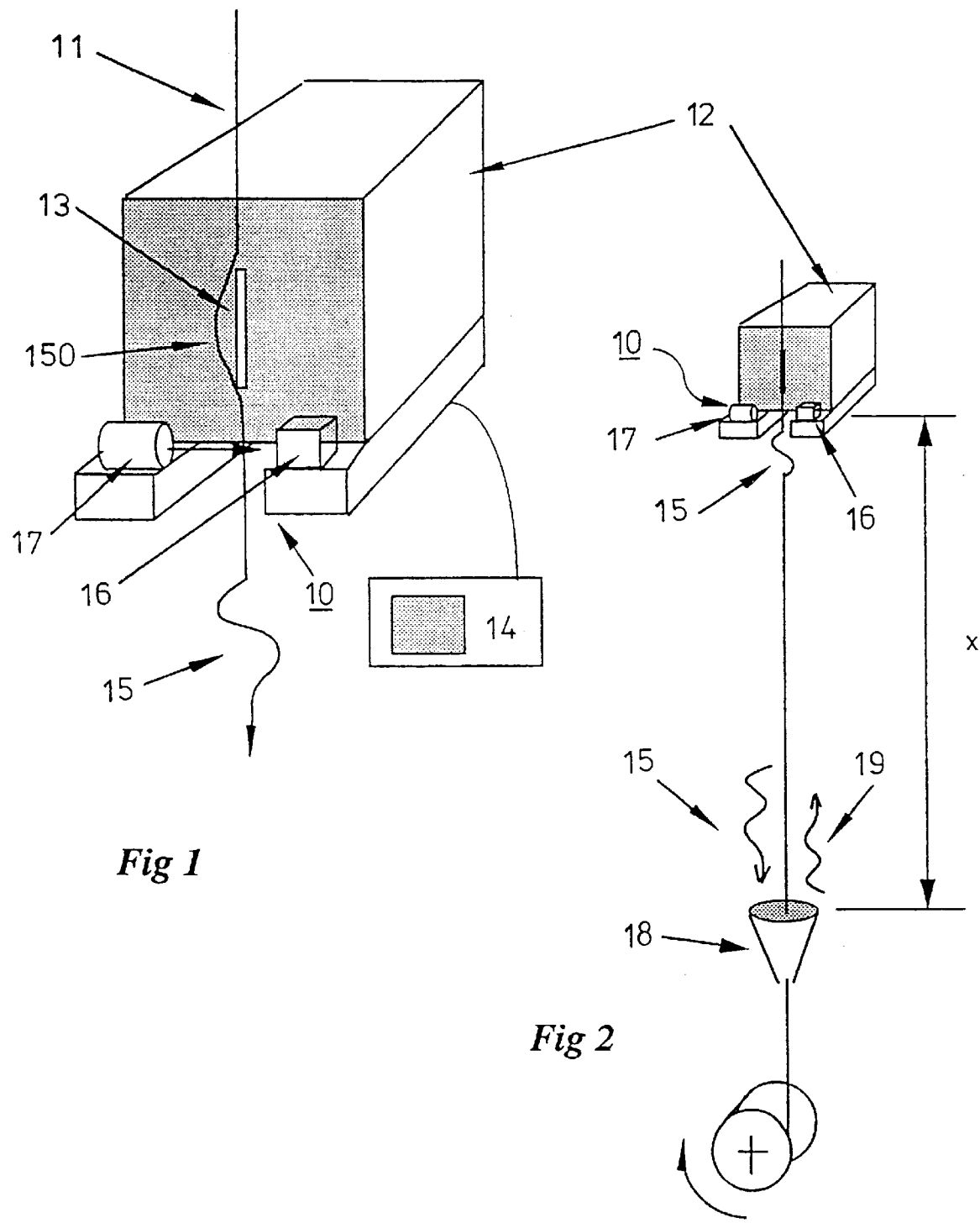
FIG. 1 is a schematic illustration of a measurement arrangement and illustrates the advancing of the vibration produced by a loudspeaker in the fiber as well as the vibration of the fiber in front of an optical detector.
FIG. 2 illustrates the reflection of the wire wave in the direction of arrival from the coating vat.

In the embodiment shown in FIGS. 1 and 2, the measurement device is denoted generally with the reference numeral 10. An optical fiber 11 is caused to enter into a linearly polarized vibration movement by means of an acoustic pressure surge, which is produced by means of an enclosed loudspeaker 12, in front of which there is a narrow gap 13 parallel to the fiber 11. An electronic surge signal, controlled by means of a computer 14 at a frequency of about 300 Hz, is passed to the loudspeaker, which surge signal is modified into said acoustic wire wave surge. The bend 150 produced in the fiber starts advancing along the fiber 11 in both directions. This bend, i.e. the wire wave 15, advances the faster, the higher the tension in the fiber 11 is. The speed of the wire wave 15 is measured by means of one optical indicator 16, which measures the location of the shadow of the illuminated fiber 11 on this indicator. The illumination of the optical fiber 11 takes place by means of an illuminator 17, which can be, for example, a LED lamp. The illumination of the fiber 11 produces a shadow on the indicator 16, and the location of the shadow can then be measured in real time by means of a control computer 14 connected to the indicator 16.

When the fiber 11 vibrates, of course, its shadow also vibrates. When the vibration advances along the fiber 11, it first by-passes the optical indicator 16 placed underneath the loudspeaker 12 and advances then down to the coating vat 18, at which time reflecting takes place from the surface of the vat 18 so that the wire wave 15 is reflected back in relation to its direction of arrival, and the wave again reaches the optical indicator detector 16. Thus, the speed of the wire wave is obtained by measuring the difference in time between the departing vibration and the arriving vibration. Of course, this requires that the distance x between the coating vat 18 and the optical indicator 16 is known. In practice, in the fiber draw tower, the distance x is of an order of 3 to 4 metres. In this connection it is to be noticed that the wire wave surge also advances upwards towards the what is called pre-form in the molten state, i.e. the glass blank. From the molten pre-form, however, no reflection is received, because the molten glass attenuates the vibration efficiently. It is important to notice that the loudspeaker 12 makes the fiber 11 vibrate in a what is called linearly polarized vibration, which means that the fiber 11 vibrates in its own plane perpendicularly to the direction of measurement of the optical indicator 16 and not, for example, in a circularly polarized plane. In such a case, for example, the optical measurement of the diameter of the fiber 11 is not disturbed.

When the wire wave 15 advances along the fiber 11, of course, the wire wave meets the upper end and the lower end of the fiber 11, but, as was stated above, no reflection comes from the upper end, but a sufficiently strong reflection is received from the polymer coating vat 18 so as to permit operation of the principle of measurement. FIG. 2 illustrates the formation of the reflection and the situation that, in the fiber 11, thus, there are two wire wave surges advancing in opposite directions. It is also to be noticed that a standing wave is not produced in the fiber, but expressly an advancing wave movement, whose advancing speed can be measured relatively easily from the difference in time between the vibrations by means of the optical indicator placed below the loudspeaker, the distance x of said indicator from the coating vat being known.

FIG. 2 illustrates a situation in which the departing wire wave surge 15 and the wire wave surge 19 reflected from the coating vat 18 by-pass the indicator 16, at which the fiber vibrating in front of the indicator 16 is illuminated by means of a LED lamp 17, in which connection the movement of the shadow of the fiber 11 cast on the indicator 16 can be monitored electronically. The electronic signal produced by the optical indicator 16 is passed to the computer 14, in which it can be analyzed so that the speed of the wave movement and the tensile stress in the fiber 11 can be calculated from the formula given above, by means of conventional computing algorithms of the computer 14.

The drawing speed of the optical fiber 11 is about 4 . . . 10 metres per second. On the other hand, it is known that the speed of the wire wave 15 in the drawing situation is about 100 metres per second, with the draw tensions commonly used. Then, this means an error of about 5 . . . 10% in the measurement accuracy because of the inherent movement of the fiber 11. This error can be detrimental, and it requires compensation. The inherent speed of the fiber 11 can be compensated for, e.g., by means of the computer by means of computing if the drawing speed of the fiber 11 is known. It is a difficulty that, when the drawing starts, in which situation it would be highly important to know the draw tension, the fiber 11 is in an accelerating movement, which is called "ramp-up". By means of the computer 14, it is inconvenient to carry out continuous compensation for speed. Now, it is a second important feature of the present invention that the compensation for speed takes place automatically, because the wave produced in the fiber 11 advances both "upstream" and "downstream" in relation to the movement of the fiber 11, seen from the loud-speaker 12.

When the wire wave 15 starts advancing, one wave advances downstream along with the speed of the fiber 11, and the other wave, the reflected one, again moves upstream in the direction contrary to the movement of the fiber 11. This inherent movement of the fiber 11 produces a speed error in each of these waves, which errors are of opposite signs. When the speed of the wave is first measured downstream (downwards) and after that through the reflection upstream (upwards), the inherent speed of the fiber 11 can be eliminated automatically, because the inherent movement of the fiber 11 is summed in one wave, and it is reduced from the other. I.e., for the speed of the wire wave 15, a value is obtained in which the inherent speed of the fiber 11 is not present. For this, just one optical measurement detector is required.

For calculation of the tension, the density of the fiber 11 per unit of length must be known. It can be calculated by measuring the diameter of the fiber 11 optically. All fiber 11 draw towers include an optical fiber diameter meter, which often also uses a CCD camera. Since the vibration of the fiber 11 is linearly polarized, the polarization of the vibration can be arranged such that it does not interfere with the measurement of the fiber 11 diameter.

The vibration of the fiber 11 can also disturb the drawing and the coating of the fiber 11 so that it produces unevenness in the fiber. In practice, the amplitude of the vibration is of an order of the fiber 11 diameter, and as it attenuates very rapidly in the polymer coating vat 18 and in the molten glass, the detrimental effect of the vibration is minimal.

It is seen from the above description than the present invention differs from the prior art essentially in the respect that it measures the tensile stress 11 in the fiber by means of one optical indicator 16 only and, at the same time, automatically compensates for the error in the draw tension arising from the inherent draw speed of the fiber 11. With constantly increasing draw speeds, the compensating for the speed error becomes ever more important.

We claim:

1. A measurement device for measuring tension in an optical fiber or a wire before the optical fiber or wire is coated in a coating vat, comprising
   a device for producing a vibration surge in the optical fiber or wire which vibrates at a certain frequency and advances as a linearly polarized wire wave,
   an optical location-sensitive indicator arranged between said device for producing the vibration surge and the coating vat for measuring the advancing speed (v) of the wire wave, said indicator being arranged at a set distance from the coating vat, and
   an illuminator device for illuminating the optical fiber or wire such that a shadow or an image of the vibrating optical fiber or wire is cast onto said indicator, whereby the tension (T) of the optical fiber or wire is calculated from the equation $T=v^2 \cdot M$, when M is the fiber mass per unit of length of the optical fiber or wire,
   said indicator being arranged to measure the time at which the wire wave passes said indicator in a direction of travel from said device for producing the vibration surge to a coating vat and the time at which a wire wave reflected from the coating vat passes said indicator, the velocity of the wave being obtained from a difference between the times at which the wave passes by said indicator and the distance between said indicator and the coating vat.

2. The measurement device of claim 1, wherein said device for producing the vibration surge is structured and arranged to cause the wave formed in the optical fiber or wire to vibrate in a polarization plane which is perpendicular to an optical measurement axis of said indicator.

3. The measurement device of claim 1, wherein said device for producing the vibration surge comprises a loudspeaker arranged relative to the optical fiber or wire such that a narrow gap is formed in front of said loudspeaker between said loudspeaker and the optical fiber or wire.

4. A method for measuring tension in an optical fiber or a wire, comprising the steps of:
   producing a linearly polarized, traveling wave in the optical fiber or wire, and
   measuring the velocity (v) of the wave in the optical fiber or wire, whereby the tension (T) of the optical fiber or wire is calculated from the equation $T=v^2 \cdot M$, when M is the fiber mass per unit of length of the optical fiber or wire,
   said velocity measuring step comprising the steps of:
      arranging a location-sensitive indicator at a set distance from a reflector capable of reflecting the wave,
      measuring the time at which the wave traveling in a first direction passes by said indicator and the time at which the wave traveling in a second direction opposite to said first direction upon reflection from said reflector passes by said indicator, and
      determining the velocity of the wave from a difference between the times at which the wave passes by said indicator and the distance between said indicator and said reflector.

5. A measurement device for measuring tension in an optical fiber or a wire, comprising
   wave producing means for producing a linearly polarized, traveling wave in the optical fiber or wire, and
   velocity measurement means for measuring the velocity (v) of the wave in the optical fiber or wire, whereby the tension (T) of the optical fiber or wire is calculated from the equation $T=v^2 \cdot M$, when M is the fiber mass per unit of length of the optical fiber or wire,
   said velocity measurement means comprising
      a location-sensitive indicator, and
      reflecting means arranged at a set distance from said indicator for reflecting the wave,
      said indicator being structured and arranged to measure the time at which the wave traveling in a first direction passes by said indicator and the time at which the wave traveling in a second direction opposite to said first direction upon reflection from said reflecting means passes by said indicator, the velocity of the wave being obtained from a difference between the times at which the wave passes by said indicator and the distance between said indicator and said reflecting means.

6. The measurement device of claim 5, wherein said velocity measurement means further comprise an illuminator for illuminating the optical fiber or wire such that a shadow of the optical fiber or wire is cast onto said indicator.

7. The measurement device of claim 5, wherein velocity measurement means are arranged between said wave producing means and said reflecting means.

8. The measurement device of claim 5, wherein said indicator consists of a single optical indicator.

9. The measurement device of claim 5, wherein said wave producing means are structured and arranged to cause the wave formed in the optical fiber or wire to vibrate in a polarization plane which is perpendicular to an optical measurement axis of said indicator.

10. The measurement device of claim 5, wherein said wave producing means comprise a loudspeaker arranged relative to the optical fiber or wire such that a narrow gap is formed in front of said loudspeaker between said loudspeaker and the optical fiber or wire.

11. The measurement device of claim 5, wherein said reflecting means comprise a coating vat in which the optical fiber or wire is coated.

12. A measurement device for measuring tension in an optical fiber or a wire before the optical fiber or wire passes into a coating vat to be coated, comprising
   wave producing means for producing a linearly polarized, traveling wave in the optical fiber or wire, and velocity measurement means for measuring the velocity (v) of the wave in the optical fiber or wire, whereby the tension (T) of the optical fiber or wire is calculated from the equation $T=v^2 \cdot M$, when M is the fiber mass per unit of length of the optical fiber or wire, said velocity measurement means comprising a location-sensitive indicator adapted to be arranged at a set distance from the coating vat, said indicator being structured and arranged to measure the time at which the wave traveling in a first direction passes by said indicator and the time at which the wave traveling in a second direction opposite to said first direction upon reflection from the coating vat passes by said indicator, the velocity of the wave being obtained from a difference between the times at which the wave passes by said indicator and the distance between said indicator and the coating vat.

13. The measurement device of claim 12, wherein velocity measurement means are arranged between said wave producing means and the coating vat.

14. The measurement device of claim 12, wherein said indicator consists of a single optical indicator.

15. The measurement device of claim 12, wherein said wave producing means are structured and arranged to cause the wave formed in the optical fiber or wire to vibrate in a polarization plane which is perpendicular to an optical measurement axis of said indicator.

16. The measurement device of claim 12, wherein said wave producing means comprise a loudspeaker arranged relative to the optical fiber or wire such that a narrow gap is formed in front of said loudspeaker between said loudspeaker and the optical fiber or wire.

17. The measurement device of claim 12, wherein said velocity measurement means further comprise an illuminator for illuminating the optical fiber or wire such that a shadow of the optical fiber or wire is cast onto said indicator.

18. The method of claim 4, further comprising the step of passing the optical fiber or wire through a coating vat such that said coating vat constitutes said reflector.

19. The method of claim 4, further comprising the step of illuminating the optical fiber or wire such that a shadow of the optical fiber or wire is cast onto said indicator.

20. The method of claim 4, wherein said step of producing the wave comprises the step of arranging a loudspeaker adjacent the optical fiber or wire, further comprising the step of arranging said indicator between said loudspeaker and said reflector.

21. The method of claim 4, further comprising the step of utilizing a single optical indicator to eliminate an error produced by the inherent draw speed of the optical fiber or wire in the speed of the wave.

* * * * *